United States Patent
Blok et al.

(10) Patent No.: US 11,834,536 B2
(45) Date of Patent: Dec. 5, 2023

(54) BUTYL RUBBER ADDITIVES FOR IMPROVED TIRE TREAD PERFORMANCE

(71) Applicant: ExxonMobil Chemical Patents Inc., Baytown, TX (US)

(72) Inventors: Edward J. Blok, Huffman, TX (US); Anthony J. Dias, Houston, TX (US); Paul T. Q. Nguyen, League City, TX (US); Erick E. Wurzinger, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 581 days.

(21) Appl. No.: 17/043,274

(22) PCT Filed: Apr. 9, 2019

(86) PCT No.: PCT/US2019/026597
§ 371 (c)(1),
(2) Date: Sep. 29, 2020

(87) PCT Pub. No.: WO2019/199839
PCT Pub. Date: Oct. 17, 2019

(65) Prior Publication Data
US 2021/0032389 A1 Feb. 4, 2021

Related U.S. Application Data

(60) Provisional application No. 62/655,980, filed on Apr. 11, 2018.

(51) Int. Cl.
| | |
|---|---|
| *C08L 7/00* | (2006.01) |
| *C08L 25/08* | (2006.01) |
| *C08L 91/00* | (2006.01) |
| *C08K 3/36* | (2006.01) |
| *C08K 5/00* | (2006.01) |
| *C08K 5/01* | (2006.01) |
| *B60C 1/00* | (2006.01) |
| *C08F 236/06* | (2006.01) |
| *C08F 236/08* | (2006.01) |
| *C08F 236/10* | (2006.01) |
| *C08K 3/04* | (2006.01) |
| *C08K 5/5419* | (2006.01) |

(52) U.S. Cl.
CPC .......... *C08F 236/06* (2013.01); *B60C 1/0016* (2013.01); *C08F 236/08* (2013.01); *C08F 236/10* (2013.01); *C08K 3/04* (2013.01); *C08K 3/36* (2013.01); *C08K 5/0025* (2013.01); *C08K 5/01* (2013.01); *C08K 5/5419* (2013.01); *C08L 7/00* (2013.01); *C08L 25/08* (2013.01); *C08L 91/00* (2013.01); *C08L 2205/03* (2013.01); *C08L 2207/04* (2013.01)

(58) Field of Classification Search
CPC . C08L 7/00; C08L 25/08; C08L 91/00; C08K 3/36; C08K 5/00; C08K 5/01; B60C 1/00
USPC ........................................................ 523/156
See application file for complete search history.

(56) References Cited

U.S. PATENT DOCUMENTS

| | | |
|---|---|---|
| 8,501,894 B2 | 8/2013 | Crowther et al. |
| 8,835,563 B2 | 9/2014 | Crowther et al. |
| 9,273,163 B2 | 3/2016 | Crowther et al. |
| 9,527,993 B2 | 12/2016 | Duc et al. |
| 2007/0082991 A1 | 4/2007 | Chassagnon et al. |

FOREIGN PATENT DOCUMENTS

| | | |
|---|---|---|
| EP | 0905185 | * 3/1999 |
| WO | 2016/053541 | 4/2016 |
| WO | 2019/199833 | 10/2019 |
| WO | 2019/199835 | 10/2019 |
| WO | 2019/199840 | 10/2019 |

* cited by examiner

*Primary Examiner* — Deve V Hall

(57) ABSTRACT

An elastomeric composition is disclosed. The elastomeric composition includes, per 100 parts by weight of rubber (phr): about 30 to about 50 phr of polybutadiene having a cis-1,4 linkage content of at least 95%; about 40 to about 70 phr of styrene/butadiene copolymer; about 0 to about 20 phr of natural rubber or polyisoprene; about 0 to about 30 phr of a processing oil; about 10 to about 30 phr of a hydrocarbon resin; about 50 to about 75 phr of a filler; a curative agent; an antioxidant; a silane coupling agent; and about 5 to about 30 phr of a butyl copolymer rubber containing about 85 to about 99.5 mol % $C_4$-$C_7$ isoolefin(s) and from about 0.5 to about 15 mol % $C_4$-$C_{14}$ conjugated dienes.

13 Claims, No Drawings

BUTYL RUBBER ADDITIVES FOR IMPROVED TIRE TREAD PERFORMANCE

CROSS-REFERENCE TO RELATED APPLICATIONS

This application is a U.S. national phase application of PCT application No. PCT/US2019/026597 having a filing date of Apr. 9, 2019, which claims priority to and the benefit of U.S. provisional application Ser. No. 62/655,980 having a filing date of Apr. 11, 2018, the contents of both of which are incorporated by reference in their entirety.

FIELD OF THE INVENTION

The present invention relates to butyl rubbers useful as modifiers for tire treads.

BACKGROUND OF THE INVENTION

The tire tread compound is an important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound glass transition temperature (Tg) would provide better wet traction but, at the same time, increase the rolling resistance and tread wear. There are needs to develop a tread compound additive that can provide good wet traction without increasing the rolling resistance and tread wear.

Functionalized SBR (styrene butadiene rubber) is one method to improve this trade-off by improving filler dispersion. NANOPRENE™, sub-micron to micron sized gels from Arlanxeo with cross-linked butadiene cores and acrylic shells, is another additive used to increase the wet traction without affecting rolling resistance. However, Nanoprene can only deliver limited improvement in wet traction.

Related references include U.S. Pat. Nos. 8,835,563; 8,501,894; 9,527,993; and 9,273,163.

SUMMARY OF THE INVENTION

Described herein is an elastomeric composition comprising, per 100 parts by weight of rubber (phr): about 30 to about 50 phr of polybutadiene having a cis-1,4 linkage content of at least 95%; about 40 to about 70 phr of styrene/butadiene copolymer; about 0 to about 20 phr of natural rubber or polyisoprene; about 0 to about 30 phr of a processing oil; about 10 to about 30 phr of a hydrocarbon resin; about 50 to about 75 phr of a filler; a curative agent; an antioxidant; a silane coupling agent; and about 5 to about 30 phr of a butyl copolymer rubber containing about 85 to about 99.5 mol % $C_4$-$C_7$ isoolefin(s) and from about 0.5 to about 15 mol % $C_4$-$C_{14}$ conjugated dienes.

Also disclosed is a method of balancing the wet traction performance and rolling resistance in a tire tread comprising combining at least a filler, a polybutadiene, a styrene/butadiene copolymer, natural rubber or polyisoprene, and a curative agent with one or more butyl copolymer rubbers to form a tire tread; wherein the butyl copolymer rubber contains 85 to 99.5 mole percent (mol %) $C_4$-$C_7$ isoolefins and from 0.5 to 15 mol % $C_4$-$C_{14}$ conjugated dienes; and effecting a cure of the components to form a tire tread; wherein the level of the butyl copolymer rubber(s) relative to the other components, and its comonomer content, can be varied to improve the balance of wet traction and rolling resistance of a tire tread.

DETAILED DESCRIPTION OF THE INVENTION

This invention is directed to the use of butyl copolymer rubbers in tire tread compositions. The butyl copolymer rubbers are prepared by polymerizing (i) $C_4$-$C_7$ isoolefins with (ii) $C_4$-$C_{14}$ conjugated dienes. The butyl copolymer rubbers contain from 85 to 99.5 mol % $C_4$-$C_7$ isoolefins and from 0.5 to 15 mol % $C_4$-$C_{14}$ conjugated dienes.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Typically, raising the composition's Tg would provide good wet traction but, at the same time, increase the rolling resistance and tread wear. The embodiments described herein, on the other hand, provide a tread compound additive that can deliver superior wet traction without lowering the rolling resistance and tread wear.

The problem has been approached by developing an additive, a butyl copolymer rubber that increases hysteresis in the wet traction region (0° C.) and lowers hysteresis in the rolling resistance region (60° C.) without changing the overall compound Tg.

The additive compounding step allows one to address the known deficiencies of polyolefin blends with styrene-butadiene rubber/polybutadiene/natural rubber (SBR/PBD/NR) compositions by concentrating the carbon black and antioxidant in the polyolefin domain to improve abrasion resistance, cure state and UV stability. These deficiencies include poorly vulcanized and poorly reinforced polyolefin domains as curatives and fillers migrate away from the polyolefin due to unfavorable solubility parameter differences. The present embodiments described herein overcome one or more of these deficiencies.

Butyl Copolymer Rubber

The term "butyl rubber" or "butyl rubber copolymer" as used in the specification and claims means copolymers of $C_4$ to $C_7$ isoolefins and $C_4$ to $C_{14}$ conjugated dienes which comprise about 0.5 to about 15 mol % conjugated diene and about 85 to 99.5 mol % isoolefin. Illustrative examples of the isoolefins which may be used in the preparation of butyl rubber are isobutylene, 2-methyl-1-propene, 3-methyl-1-butene, 4-methyl-1-pentene and beta-pinene. Illustrative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. The preparation of butyl rubber is described in U.S. Pat. No. 2,356,128 and is further described in an article by R M. Thomas et al. in Ind. & Eng. Chem., vol. 32, pp. 1283 et seq., October, 1940. Butyl rubber generally has a viscosity average molecular weight between about 100,000 to about 1,500,000, preferably about 250,000 to about 800,000 and a Wijs Iodine No. (INOPO) of about 0.5 to 50, preferably 1 to 20 (for a description of the INOPO test, see Industrial and Engineering Chemistry, Vol. 17, p. 367, 1945).

The butyl rubber may have a $C_4$ to $C_7$ isoolefin(s) amount of from about 85 to about 99.5 mol %, or from about 90 to about 99.5 mol % or from about 95 to about 99.5 mol %, based on the weight of the butyl rubber.

The butyl rubber may have a $C_4$ to $C_{14}$ conjugated diene(s) amount of from about 0.5 to about 15 mol %, or from about 0.5 to about 10 mol % or from about 0.5 to about 5 mol %, based on the weight of the butyl rubber.

An example butyl rubber is BUTYL 365 (butyl, isobutylene-isoprene rubber, available from ExxonMobil Chemical Company).

The inventive compositions may include the butyl rubber in an amount of from 5 phr to 40 phr, or from 5 phr to 25 phr.

Elastomers

The inventive tire tread compositions also comprise an elastomer. Generally the range of the elastomer is from 5 to 75% by weight of the tire tread composition. Suitable elastomers include, for example, diene elastomers.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer can be "highly unsaturated," resulting from conjugated diene monomers, which have a greater than 50% molar content of units.

According to one aspect, each diene elastomer having a Tg from −75° C. to −0° C. is selected from the group consisting of styrenebutadiene copolymers, natural polyisoprenes, synthetic polyisoprenes having a cis-1,4 linkage content greater than 95%, styrene/butadiene/isoprene terpolymers and a mixture of these elastomers, and each diene elastomer having a Tg from −10° C. to −75° C., preferably from −100° C. to −80° C., is selected from the group consisting of polybutadienes having a cis-1,4 linkage content greater than 90% and isoprene/butadiene copolymers comprising butadiene units in an amount equal to or greater than 50%.

In another aspect, each diene elastomer having a Tg from −75° C. to −40° C. is selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%, or greater than 95%.

In one embodiment, the composition comprises a blend of the diene elastomer(s) having a Tg from −75° C. to −0° C. and each of the diene elastomer(s) having a Tg from −110° C. to −75° C.

In one aspect, the composition comprises a blend of at least one of the polybutadienes having a cis-1,4 linkage content greater than 90% with at least one of the natural or synthetic polyisoprenes (having a cis-1,4 linkage content greater than 95%).

In another aspect, the composition comprises a blend of at least one of the polybutadienes having a cis-1,4 linkage content greater than 90% with at least one of the terpolymers of styrene, isoprene and butadiene.

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used herein is understood more particularly to mean: (a) any homopolymer obtained by polymerization of a conjugated diene monomer having from 4 to 12 carbon atoms: (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; and (d) a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol ends, alkoxysilane groups, carboxyl groups, or polyether groups.

The following are suitable: polybutadienes, in particular those having a content (molar %) of 1,2-units of from 4% to 80% or those having a content (molar %) of cis-1,4-units of greater than 80%, polyisoprenes, butadiene/styrene copolymers a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight or isoprene/styrene copolymers, in particular those having a styrene content of from 5% to 50% by weight. In the case of butadiene/styrene/isoprene copolymers, those having a styrene content of from 5% to 50% by weight and more particularly of from 10% to 40%, an isoprene content of from 15% to 60% by weight and more particularly from 20% to 50%, a butadiene content of from 5% to 50% by weight and more particularly of from 20% to 40%, a content (molar %) of 1,2-units of the butadiene part of from 4% to 85%, a content (molar %) of trans-1,4-units of the butadiene part of from 6% to 80%, a content (molar %) of 1,2-plus 3,4-units of the isoprene part of from 5% to 70% and a content (molar %) of trans-1,4-units of the isoprene part of from 10% to 50%, and more generally any butadiene/styrene/isoprene copolymer.

The diene elastomer chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is predominantly (i.e., for more than 50 wt %) an SBR, whether an SBR prepared in emulsion ("ESBR") or an SBR prepared in solution ("SSBR"), or an SBR/BR, SBR/NR (or SBR/R), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1,4-bonds of from 15% to 75%; such an SBR can advantageously be used as a mixture with a BR preferably having more than 90% (molar %) of cis-1,4-bonds.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber IM), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to still another aspect, the rubber composition comprises a blend of a (one or more) "high Tg" diene elastomer exhibiting a Tg of from −70° C. to 0° C. and of a (one or more) "low Tg" diene elastomer exhibiting a Tg of from −110° C. to −80° C. more preferably from −100° C. to −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another embodiment of the invention, the rubber composition comprises, for example, from 40 to 70 phr (parts by weight per hundred parts of total elastomer), of a high Tg elastomer as a blend with 30 to 50 phr of a low Tg elastomer; according to another example, it comprises, for the whole of the 100 phr, one or more SBR(s) prepared in solution.

According to another embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Useful tire tread compositions can also comprise 0 to 70 wt % of a styrenic copolymer; 0 or 70 wt % of a polybutadiene polymer; 0 to 70 wt % of natural rubber or synthetic polyisoprene; 15 to 70 wt % of a functionalized styrenic copolymer; 0 or 5 wt % to 60 wt % of a functionalized polar polybutadiene polymer; 0 or 70 wt % of natural rubber or functionalized synthetic polyisoprene; 0 or 40 wt % of processing oil; 20 wt % to 60 wt % of filler, especially silica-based filler as described herein; a curative agent; and 5 wt % to 20 wt % of a butyl rubber described herein, and 0 or 40 wt % of a hydrocarbon resin, the weight percentages based on the total composition.

Inorganic Filler

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name ZEOSIL® Z1165.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, International Applications WO 97/36724 and WO 99/16600).

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 m²/g, preferably from 30 to 400 m²/g. Mention will be made, as highly dispersible ("HDS") precipitated silicas, for example, of the ULTRASIL™ 7000 and ULTRASIL™ 7005 silicas from Degussa, the ZEOSIL™ 1165 MP, C5 MP and 1115 MP silicas from Rhodia, the HI-SIL™ EZ150G silica from PPG, the Zeopol 8715, 8745 and 8755 silicas from Huber or silicas with a high specific surface.

Mention may also be made, as other examples of inorganic filler being capable of being used, of reinforcing aluminum (oxide), hydroxides, titanium oxides or silicon carbides (see, for example, International Applications WO 02/053634 and US 2004/0030017).

When the compositions of the invention are intended for tire treads with a low rolling resistance, the reinforcing inorganic filler used, in particular if it is silica, preferably has a BET surface of from 45 to 400 m²/g, more preferably of from 60 to 300 m²/g.

Preferably, the level of total reinforcing filler (carbon black and/or reinforcing inorganic filler) is from 20 to 200 phr, more preferably from 30 to 150 phr, the optimum being in a known way different depending on the specific applications targeted: the level of the reinforcement expected with regard to a bicycle tire, for example, is, of course, less than that required with regard to a tire capable of running at high speed in a sustained manner, for example, a motor cycle tire, a tire for a passenger vehicle or a tire for a commercial vehicle, such as a heavy duty vehicle.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V):

$$Z\text{-}A\text{-}S_x\text{-}A\text{-}Z \quad (V),$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

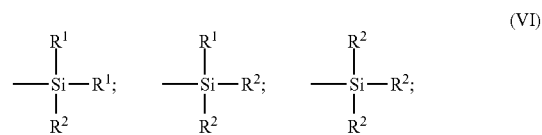

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3S_2]_2$, or bis (triethoxysilylpropyl)disulphide, abbreviated to TESPD, of formula $[(C_2H_5O)_3Si(CH_2)_3S]_2$. Other examples include bis(mono($C_1$-$C_4$)alkoxydi($C_1$-$C_4$)alkylsilylpropyl)polysulphides (in particular disulphides, trisulphides or tetrasulphides), more particularly bis(monoethoxydimethylsilylpropyl) tetrasulphide.

The coupling agent can also be bifunctional POSs (polyorganosiloxanes), or hydroxysilane polysulphides, or silanes or POSs bearing azodicarbonyl functional groups. The coupling agent can also include other silane sulphides, for example, silanes having at least one thiol (—SH) functional group (referred to as mercaptosilanes) and/or at least one masked thiol functional group.

The coupling agent can also include combinations of one or more coupling agents such as those described herein, or otherwise known in the art. A preferred coupling agent comprises alkoxysilane or polysulphurized alkoxysilane. A particularly preferred polysulphurized alkoxysilane is bis (triethoxysilylpropyl) tetrasulphide, which is commercially available by Degussa under the trade name X50S™.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name NYTEX™ 4700.

MES and TDAE oils are well known to a person skilled in the art; for example, reference is made to publication KGK (Kautschuk Gummi Kunstoffe), 52nd year, No. 12/99, pp. 799-805, entitled "Safe Process Oils for Tires with Low Environmental Impact".

Mention may be made, as examples of MES oils (whether they are of the "extracted" or "hydrotreated" type) or of TDAE oils, for example, of the products sold under the names FLEXON™ 683 by ExxonMobil, VIVATEC™ 200 or VIVATEC™ 500 by H&R European, PLAXOLENE™ MS by Total, or CATENEX™ SNR by Shell.

Other suitable plasticizers for use in the present invention include "triesters" or "fatty acids". Triester and fatty acid generally refer to a mixture of triesters or a mixture of fatty acids, respectively.

Among the preferred glycerol trioleates, mention will be made in particular, as examples of natural compounds, of the vegetable oils sunflower oil or rapeseed oil having a high content of oleic acid (more than 50%, more preferably more than 80% by weight).

The resins (it should be remembered that the term "resin" is reserved by definition for a solid compound) formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions.

The $C_5$ fraction/vinylaromatic copolymer is, by definition and in a known way, a copolymer of a vinylaromatic monomer and of a $C_5$ fraction.

Styrene, alpha-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a $C_9$ fraction (or more generally from a $C_8$ to $C_{10}$ fraction), for example, are suitable as vinylaromatic monomers. Preferably, the vinylaromatic compound is styrene or a vinylaromatic monomer resulting from a $C_9$ fraction (or more generally from a $C_8$ to $C_{10}$ fraction).

In a known way, the term $C_5$ fraction (or, for example, $C_9$ fraction respectively) is understood to mean any fraction resulting from a process resulting from petrochemistry or from the refining of petroleums, any distillation fraction predominantly comprising compounds having 5 (or respectively 9, in the case of a $C_9$ fraction) carbon atoms; the $C_5$ fractions, for example, may comprise, by way of illustration and without limitation, the following compounds, the relative proportions of which may vary according to the process by which they are obtained, for example according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexene. These fractions may be obtained by any chemical process known in the petroleum industry and petrochemistry. Mention may be made, as non-limiting examples, of processes for the steam cracking of naphtha or processes for the fluid catalytic cracking of gasolenes, it being possible for these processes to be combined with any possible chemical treatment for the conversion of these fractions known to a person skilled in the art, such as hydrogenation and dehydrogenation.

The plasticizing hydrocarbon resins useful in an embodiment of the invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include: styrene, alpha-methylstrene, ortho-, meta-, para-methylstyrene, vinyl-toluene, para-tetrtiobutylstyrene, methoxystyrenes, chloro-styrenes, vinyl-mesitylene, divinylbenzene, vinylnaphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ cut/$C_9$ cut copolymer resins, and mixtures thereof.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available by Eastman under the trade name SANTOFLEX™ 6PPD (N-(1,3-Dimethylbutyl)-N'-phenyl-1,4-phenylenediamine).

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing

These compounds were mixed in suitable mixers, using at least two successive passes well known to the person skilled in the art. The non-productive passes (mixing without crosslinking system) which have mixing at high temperatures between 110° C. and 190° C. The non-productive passes are followed by a productive pass where the crosslinking system is added. The temperature for this mixing is typically below 110° C.

The tire tread composition has many desirable properties when the butyl rubber is present in the compositions.

The various descriptive elements and numerical ranges disclosed herein for the butyl rubbers, the reactants used to make the butyl rubbers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

Examples

Sample Preparation of Compounds

Additive mixing: BUTYL 365 was compounded with other components to produce Butyl Compound per Table 1.

All components are listed in phr, or part per hundred, of polymer unit. These compounds were mixed in suitable mixers, using at least two successive passes well known to the person skilled in the art. The mixing temperatures range between 110° C. and 210° C. The duration of the mixing for each of the individual mixing steps is between 1 and 30 minutes depending on desired property.

TABLE 2

Butyl Compound formulation

| Component* | Amount (phr**) |
|---|---|
| BUTYL 365 | 100 |
| Carbon black | 8 |

TABLE 2-continued

Butyl Compound formulation

| Component* | Amount (phr**) |
|---|---|
| CHIMASSORB ® 2020 | 0.8 |
| 388 Super Fine Sulfur | 2.5 |

*CHIMASSORB ® 2020 (high-molecular-weight, hindered amine light stabilizer, available from BASF); AKRO-ZINC ® BAR 25 (French process zinc oxide in naphthenic oil, available from Akrochem Corporation); Pre 3 Carbon Black available from Cabot
**parts by weight per hundred parts of total BUTYL 365

Silica Tread Compounding

Tread compound formulations for the controls and examples are listed in Table 3. All components are listed in phr, or part per hundred, of polymer unit. These compounds were mixed in suitable mixers, using at least two successive passes well known to the person skilled in the art. The non-productive passes (mixing without crosslinking system) which have mixing at high temperatures between 110° C. and 190° C. The non-productive passes are followed by a productive pass where the crosslinking system is added. The temperature for this mixing is typically below 110° C.

TABLE 3

Tire tread formulations using Butyl Compound and corresponding controls

| Component* | TT-1** | TT-2** | TT-3** | TT-4** | TT-5** | TT-6** | TT-7** | TT-8** |
|---|---|---|---|---|---|---|---|---|
| Non-Productive Pass Components | | | | | | | | |
| NIPOL ® NS 116R | 46.7 | 46.7 | 46.7 | 46.7 | 46.7 | 46.7 | 46.7 | 55.5 |
| ZEOSIL ® 1165MP | 67 | 67 | 67 | 67 | 67 | 67 | 67 | 67 |
| BUDENE ® 1208 | 38.3 | 38.3 | 38.3 | 38.3 | 38.3 | 38.3 | 38.3 | 29.5 |
| SMR ™ 20 | 15 | 15 | 15 | 15 | 15 | 15 | 15 | 15 |
| Resin type 1-8 | 20 | 20 | 20 | 20 | 20 | 20 | 20 | 20 |
| SANTOFLEX ™ 6PPD | 2 | 2 | 2 | 2 | 2 | 2 | 2 | 2 |
| X 50S ® | 10.5 | 10.5 | 10.5 | 10.5 | 10.5 | 10.5 | 10.5 | 10.5 |
| Stearic acid | 2.5 | 2.5 | 2.5 | 2.5 | 2.5 | 2.5 | 2.5 | 2.5 |
| Butyl Compound | | 20 | 20 | 20 | 20 | 20 | 20 | 20 |
| Productive Pass Components | | | | | | | | |
| AKRO-ZINC ® BAR 25 | 2 | 2 | 2 | 2 | 2 | 2 | 2 | 2 |
| CBS | 1.19 | 1.19 | 1.19 | 1.19 | 1.19 | 1.19 | 1.19 | 1.19 |
| 388 Super Fine Sulfur (new | 1.4 | 1.4 | 1.4 | 1.4 | 1.4 | 1.4 | 1.4 | 1.4 |
| DPG | 1.4 | 1.4 | 1.4 | 1.4 | 1.4 | 1.4 | 1.4 | 1.4 |

*NIPOL ® NS 116R (styrene butadiene rubber with 21% bound styrene, available from Zeon Corporation); ZEOSIL ® 1165MP (amorphous precipitated silica, available from Rhodia); BUDENE ® 1208 (1,3-butadiene, homopolymer, available from Goodyear Chemical); SMR ™ 20 (natural polymer of cis-polyisoprene, available from Herman Webber & Co.); SANTOFLEX ™ 6PPD (N-(1,3-Dimethylbutyl)-N'-phenyl-p-phenylenediamine, available from Eastman Chemical); X 50S ® (bis(triethoxysilylpropyl)tetrasulfide with carbon black, available from Evonik Industries); AKRO-ZINC ® BAR 25 (French process zinc oxide in naphthenic oil, available from Akrochem Corporation); N-cyclohexyl-2-benzothiazylsulfenamide (CBS); diphenyl guanidine (DPG)
**per hundred parts of total rubber (NIPOL ® NS 116R + BUDENE ® 1208 + SMR ™ 20)
***Resins 1-8 are commercially available from ExxonMobil Chemical Co. Resin 1 is PR 373, a C5/C9 resin. Resin 2 is Escorez ™ 1102, a C5 resin. Resin 3 is PR 395, a DCPD/C9 resin. Resin 4 is Escorez ™ 5300, a DCPD resin. Resin 5 is Escorez ™ 5340, a DCPD resin. Resin 6 is PR 100, a DCPD resin. Resin 7 is PR 383, a DCPD/C9 resin. Resin 8 is PR 373 a C5/C9 resin.

Loss Tangent Measurements

The compounds listed in Table were compression molded and cured into pads. Afterward, a rectangular test specimen (12 mm wide & 30 mm long) was died out of the cured pads and mounted in an ARES G2 (Advanced Rheometric Expansion System, TA instruments) for dynamic mechanical testing in torsion rectangular geometry. Though the thickness of the test specimen was around 1.8 mm, the thickness of the specimens varied and was measured manually for each test. A strain sweep at room temperature (about 23° C.) up to 5.5% strains and at 10 Hz was conducted first followed by a temperature sweep at 4% strain and 10 Hz from −38° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 60° C. for better rolling resistance.

Table 4 provides the loss tangent measurements for the tire tread formulations using Butyl Compound (Table 3), and Table 5 provides the same measurements but as a percentage of the control tire tread formulation TT-1.

TABLE 4

Loss tangent for tire tread formulations using Butyl Compound

| Temperature (° C.) | TT-1 | TT-2 | TT-3 | TT-4 | TT-5 | TT-6 | TT-7 | TT-8 |
|---|---|---|---|---|---|---|---|---|
| −14.0 | 0.586 | 0.617 | 0.731 | 0.697 | 0.688 | 0.728 | 0.693 | 0.780 |
| −12.0 | 0.553 | 0.606 | 0.692 | 0.667 | 0.654 | 0.696 | 0.655 | 0.737 |
| −10.0 | 0.523 | 0.596 | 0.651 | 0.636 | 0.626 | 0.662 | 0.617 | 0.692 |
| −8.0 | 0.495 | 0.585 | 0.613 | 0.604 | 0.596 | 0.627 | 0.584 | 0.649 |
| −6.0 | 0.469 | 0.574 | 0.575 | 0.573 | 0.566 | 0.592 | 0.551 | 0.607 |
| −4.0 | 0.445 | 0.562 | 0.539 | 0.541 | 0.538 | 0.558 | 0.519 | 0.566 |
| −2.0 | 0.423 | 0.550 | 0.506 | 0.511 | 0.509 | 0.527 | 0.488 | 0.529 |
| 0.0 | 0.404 | 0.537 | 0.474 | 0.483 | 0.482 | 0.497 | 0.460 | 0.494 |
| 2.0 | 0.387 | 0.523 | 0.447 | 0.457 | 0.456 | 0.468 | 0.435 | 0.462 |
| 4.0 | 0.371 | 0.508 | 0.420 | 0.432 | 0.432 | 0.441 | 0.412 | 0.432 |
| 6.0 | 0.357 | 0.492 | 0.396 | 0.408 | 0.409 | 0.416 | 0.388 | 0.406 |
| 8.0 | 0.344 | 0.476 | 0.373 | 0.386 | 0.388 | 0.394 | 0.369 | 0.381 |
| 10.0 | 0.333 | 0.458 | 0.354 | 0.366 | 0.369 | 0.372 | 0.348 | 0.360 |
| 60.0 | 0.194 | 0.180 | 0.158 | 0.159 | 0.164 | 0.159 | 0.169 | 0.162 |

TABLE 5

Loss tangent (percent of TT-1) for tire tread formulations using Butyl Compound

| Temperature (° C.) | TT-1 | TT-2 | TT-3 | TT-4 | TT-5 | TT-6 | TT-7 | TT-8 |
|---|---|---|---|---|---|---|---|---|
| −14.0 | 100 | 105 | 125 | 119 | 117 | 124 | 118 | 133 |
| −12.0 | 100 | 110 | 125 | 121 | 118 | 126 | 118 | 133 |
| −10.0 | 100 | 114 | 124 | 122 | 120 | 126 | 118 | 132 |
| −8.0 | 100 | 118 | 124 | 122 | 120 | 127 | 118 | 131 |
| −6.0 | 100 | 122 | 123 | 122 | 121 | 126 | 118 | 129 |
| −4.0 | 100 | 126 | 121 | 121 | 121 | 125 | 117 | 127 |
| −2.0 | 100 | 130 | 119 | 121 | 120 | 124 | 115 | 125 |
| 0.0 | 100 | 133 | 117 | 120 | 119 | 123 | 114 | 122 |
| 2.0 | 100 | 135 | 116 | 118 | 118 | 121 | 113 | 120 |
| 4.0 | 100 | 137 | 113 | 116 | 117 | 119 | 111 | 116 |
| 6.0 | 100 | 138 | 111 | 114 | 115 | 117 | 109 | 114 |
| 8.0 | 100 | 138 | 108 | 112 | 113 | 114 | 107 | 111 |
| 10.0 | 100 | 138 | 106 | 110 | 111 | 112 | 104 | 108 |
| 60.0 | 100 | 93 | 82 | 82 | 85 | 82 | 87 | 84 |

The addition of BUTYL 365 to the tread compound improves wet traction (increased loss tangent at 0° C.) and improves rolling resistance (decreased loss tangent at 60° C.). The combination of resin and butyl additive allows one to fine tune wet braking over abroad temperature/frequency range.

Stress/Strain Measurements

Five test specimens were dies out with ASTM D4482 die and conditioned in the lab for 16 hours before testing.

Specimens were tested on an Instron 5565 with along travel mechanical extensometer.

The load cell and extensometer are calibrated before each day of testing. Extensometer is calibrated @ 20 mm as gauge length.

Sample information, operator name, date, lab temperature, and humidity are all recorded.

Specimen thickness was measured at three places in the test area. The average value was entered when prompted. The lab temperature and humidity are measured Specimen was carefully loaded in the grips to ensure grips clamp on the specimen symmetrically. The extensometer grips was then attached to the sample in the test area.

The test was prompted to start. A pre-load of 0.1N was applied. Testing began with the crosshead moving at 20 inches/minute until a break is detected.

Five specimens from each sample were tested and the median values were used for reporting.

Table 6 provides the stress/strain measurements for the tire tread formulations using Butyl Compound (Table 3), and Table 7 provides the same measurements but as a percentage of the control tire tread formulation TT-1.

TABLE 6

Stress/strain measurements for tire tread formulations using Butyl Compound

| Property | TT-1 | TT-2 | TT-3 | TT-4 | TT-5 | TT-6 | TT-7 | TT-8 |
|---|---|---|---|---|---|---|---|---|
| 300% Modulus (MPa) | 10.9 | 11.8 | 12.3 | 12.1 | 12.4 | 12.4 | 12.2 | 12.9 |
| Tensile Strength (MPa) | 20.6 | 19.6 | 21 | 20.1 | 20.5 | 20.5 | 19.6 | 19.9 |
| Elongation (%) | 502 | 462 | 478 | 458 | 460 | 459 | 446 | 439 |

TABLE 7

Stress/strain measurements (percent of TT-1) for tire tread formulations using Butyl Compound

| Property | TT-1 | TT-2 | TT-3 | TT-4 | TT-5 | TT-6 | TT-7 | TT-8 |
|---|---|---|---|---|---|---|---|---|
| 300% Modulus (% of TT-1) | 100 | 108 | 113 | 111 | 114 | 114 | 112 | 118 |
| Tensile Strength (% of TT-1) | 100 | 95 | 102 | 98 | 100 | 100 | 95 | 97 |
| Elongation (% of TT-1) | 100 | 92 | 95 | 91 | 92 | 91 | 89 | 87 |

The addition of BUTYL 365 to the tread has improved modulus, which indicates enhanced durability and handling.

In the specification and in the claims, the terms "including" and "comprising" are open-ended terms and should be interpreted to mean "including, but not limited to". These terms encompass the more restrictive terms "consisting essentially of" and "consisting of".

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising". "including", "characterized by" and "having" can be used interchangeably.

The invention claimed is:

1. An elastomeric composition comprising, per 100 parts by weight of rubber (phr):
   about 30 to about 50 phr of polybutadiene having a cis-1,4 linkage content of at least 95%;
   about 40 to about 70 phr of a styrene/butadiene copolymer;
   about 0 to about 20 phr of natural rubber or polyisoprene;
   about 0 to about 30 phr of a processing oil;
   about 10 to about 30 phr of a hydrocarbon resin;
   about 50 to about 75 phr of a filler;
   a curative agent;
   an antioxidant; and
   about 5 to about 40 phr of a butyl copolymer rubber containing about 85 to about 99.5 mol % $C_4$-$C_7$ isoolefins and from about 0.5 to about 15 mol % $C_4$-$C_{14}$ conjugated dienes.

2. The elastomeric composition of claim 1, wherein the filler is a silica-based filler.

3. The elastomeric composition of claim 1, wherein the filler is a carbon black filler.

4. The elastomeric composition of claim 1, wherein the filler is blend of a silica-based filler and a carbon black filler.

5. The elastomeric composition of claim 1, wherein the butyl rubber is isobutylene-isoprene rubber.

6. The elastomeric composition of claim 1, wherein the butyl copolymer rubber further comprises a styrene based monomer.

7. The elastomeric composition of claim 6, wherein the styrene is methyl-styrene.

8. The elastomeric composition of claim 1, wherein the butyl copolymer rubber is present in the amount of about 5 phr to about 25 phr.

9. The elastomeric composition of claim 1, wherein the glass transit temperature (Tg) of the butyl copolymer rubber is from about 0° C. to about −80° C.

10. A tire tread composition comprising the elastomeric composition of claim 1.

11. An article comprising the tire tread composition of claim 10.

12. A method of making the elastomeric composition of claim 1, comprising the steps of:
  (a) blending the polybutadiene, the styrene/butadiene copolymer, natural rubber or polyisoprene, the filler, the processing oil, and the butyl copolymer rubber to form a first component at a temperature in the range from about 110° C. to about 200° C.;
  (b) blending the curative agent with the first component at a temperature in the range of about less than 110° C.; and
  (c) recovering the elastomeric composition.

13. A method of balancing the wet traction performance and rolling resistance in a tire tread comprising the elastomeric composition of claim 1:
  combining at least the filler, the polybutadiene, the styrene/butadiene copolymer, natural rubber or polyisoprene, and the curative agent with one or more of the butyl copolymer rubbers to form the tire tread; and
  effecting a cure of the components to form a tire tread, wherein the level of the butyl copolymer rubber(s) relative to the other components, and its comonomer content, can be varied to improve the balance of wet traction and rolling resistance of a tire tread.

* * * * *